Figure 1:
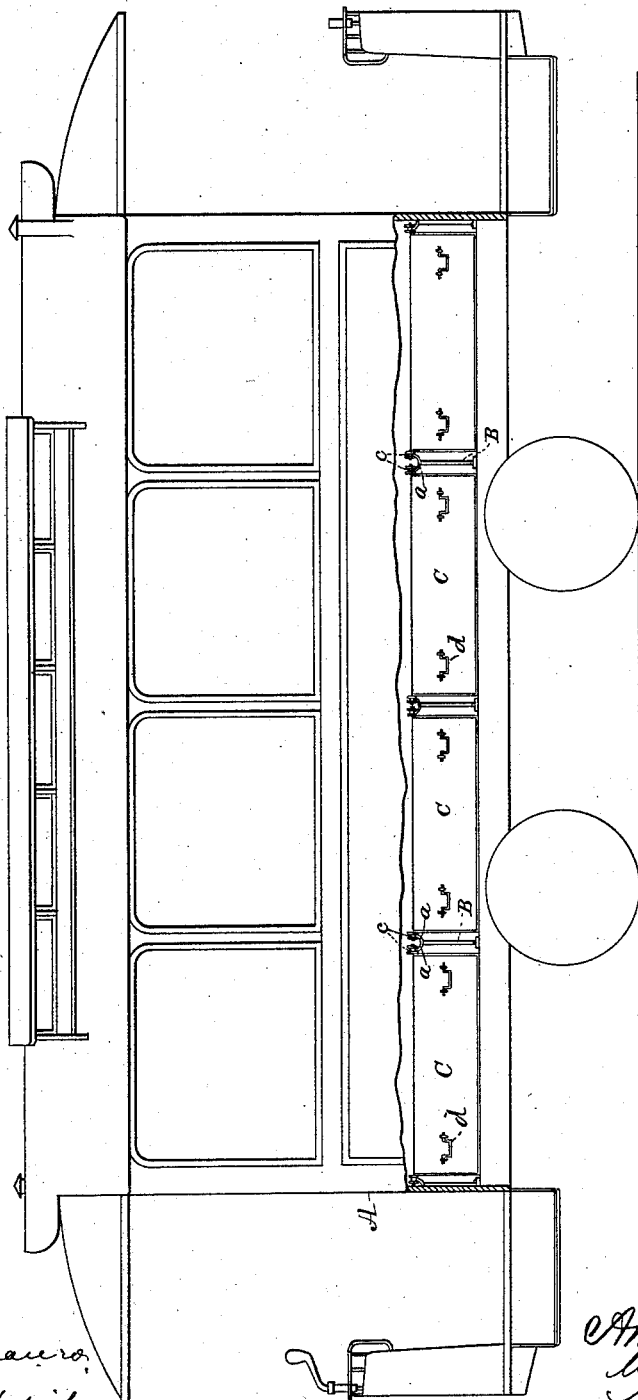

(No Model.) 3 Sheets—Sheet 1.

A. L. RIKER.
CHARGING SYSTEM FOR SECONDARY BATTERIES.

No. 407,689. Patented July 23, 1889.

Attest:
Philip Mauro
Charles J. Hedrick

Inventor:
Andrew L. Riker
by
A. Pollok
his attorney (No Model.) 3 Sheets—Sheet 2.
A. L. RIKER.
CHARGING SYSTEM FOR SECONDARY BATTERIES.
No. 407,689. Patented July 23, 1889.
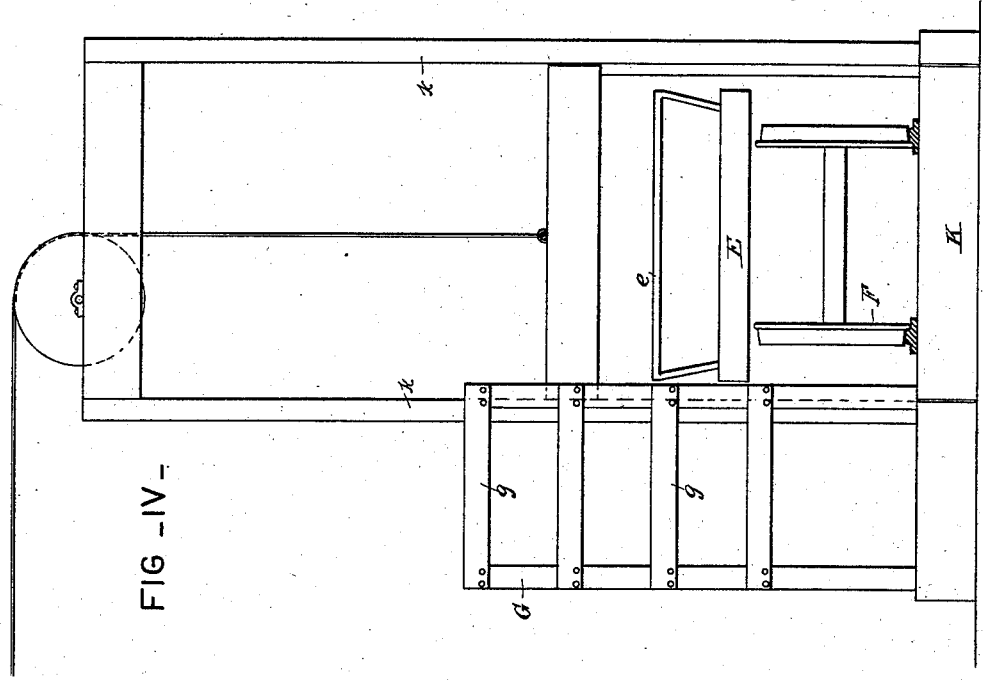
FIG. IV.
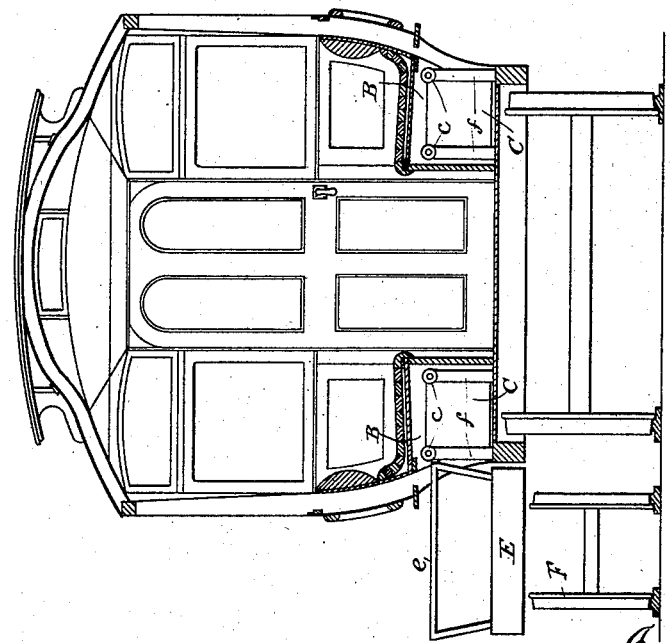
FIG. II.
Attest:
P. Leijnhaus
Charles J. Hedrick
Inventor:
Andrew L. Riker
by
P. Pollok
his attorney (No Model.) 3 Sheets—Sheet 3.
A. L. RIKER.
CHARGING SYSTEM FOR SECONDARY BATTERIES.
No. 407,689. Patented July 23, 1889.
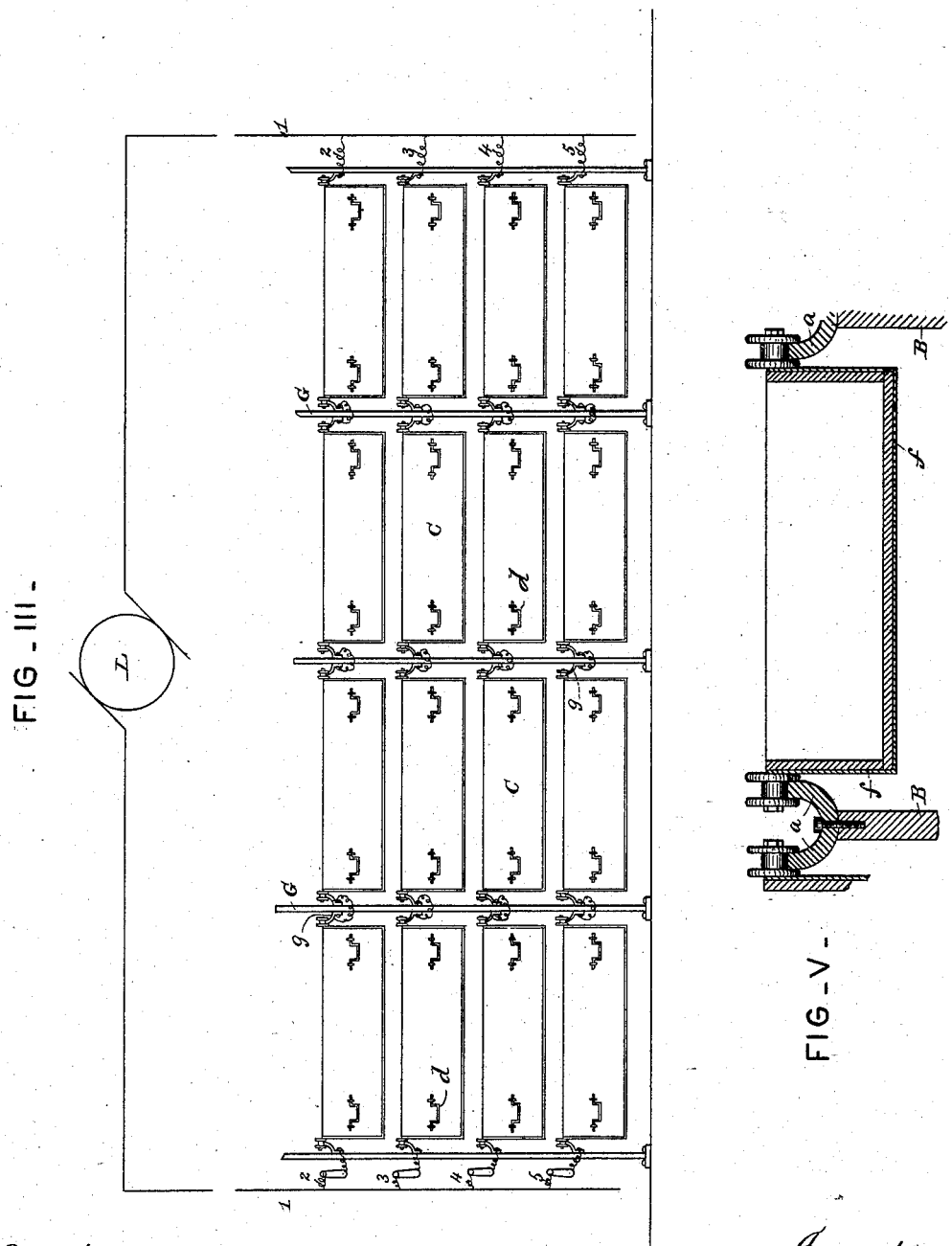

UNITED STATES PATENT OFFICE.

ANDREW L. RIKER, OF NEW YORK, N. Y.

CHARGING SYSTEM FOR SECONDARY BATTERIES.

SPECIFICATION forming part of Letters Patent No. 407,689, dated July 23, 1889.

Application filed May 9, 1889. Serial No. 310,200. (No model.)

*To all whom it may concern:*

Be it known that I, ANDREW L. RIKER, of New York city, in the county and State of New York, have invented a new and useful Improvement in Charging Systems for Secondary Batteries, which improvement is fully set forth in the following specification.

This invention has particular reference to means for charging secondary batteries used to furnish the energy for propelling land-vehicles, though the invention may in part be used for charging any batteries that are not part of a stationary plant, and which have to be conveyed to a charging-station when exhausted.

The batteries are all provided with rollers placed on the side of the containing-vessel, near the top thereof, and the car or vehicle has compartments for the several batteries, all of which compartments open on the side of the car, so that the batteries can be independently introduced. The several compartments are provided with rails at the upper part thereof, corresponding to the position of the rollers on the batteries, so that when the latter are in place they form a row lengthwise of the vehicle, each supported on its own rails. At the charging-station is provided a transfer-truck as long as the row of batteries. The truck is provided with rails, the same number as are on the car and coincidently placed, so that when the truck is drawn up alongside of the car the rails on the two vehicles will coincide, and each battery can be run directly from the car onto the truck. At the charging-station is erected a frame-work of upright bars of sufficient strength and properly braced to support the weight of the batteries to be placed thereon for charging. This supporting frame-work has a series of parallel rails spaced to correspond with those on the car and truck, so that when the truck is drawn alongside of the frame each of the batteries can be run directly onto its pair of rails. The rails on the frame are arranged in tiers, one above the other, and by means of a platform provided with hoisting means the truck can be raised to the proper height to run the batteries onto any one of the several tiers of rails. One pair of rollers on each battery-vessel is connected with the battery elements, so as to serve as terminals, and the adjacent rails on the car or other vehicle are connected electrically, the rails on the extreme end being connected with the motor by which the vehicle is propelled, so that when all the batteries are put in place the circuit is automatically completed, coupling the batteries in series with the propelling-motor. Likewise the rails of each tier on the supporting-frame are electrically connected, the rails on the extreme ends of each tier being connected with the leads from the charging-dynamo.

I am aware that it has been proposed heretofore to run the batteries out of the end of a car one after another upon suitable rails, and do not claim such arrangement.

I will now describe my system in detail, referring to the accompanying drawings, in which—

Figure I is a partial side view of a car arranged according to my invention; Fig. II, a cross-section of the same and of the truck; Fig. III, a front view of the supporting-frame; Fig. IV, a partial section showing frame, truck, and hoisting-platform; Fig. V, a detail view showing the construction of the supporting-rails on the car.

The car A is arranged to hold the batteries under the seats B, as is common. This space is open (when the batteries do not occupy it) for the entire length of the car. Rails *a*, running transverse of the car, are arranged near the top of the space aforesaid, the rails being equidistant and dividing said space into a series of compartments, each of the size to contain a single battery-vessel C. The rails (except those on the extreme end) are conveniently made of a single U-shaped casting, as shown in Fig. V, each casting thus forming two rails. The casting is bolted to a wooden support B, or otherwise suitably mounted, so as to be electrically insulated.

Each battery-vessel C has four rollers *c*, grooved to fit the rails *a* and arranged on opposite sides of the vessel, near the top thereof. These rollers are for convenience attached to slings or straps *f*, Fig. V, which pass under and are bolted to the battery-vessel. Each vessel C is provided with handles *d* for convenience in moving it.

E, Figs. II and IV, represents a truck mounted on wheels F, which run on a narrow-gage track arranged at the charging-station adjacent to the track on which the cars are run when returned to exchange exhausted batteries for charged ones. Truck E is of about the same length as car A, and has an equal number of rails e, correspondingly constructed and disposed, so that when the truck is run alongside the car, as shown in Fig. II, the rails on each coincide, and each battery can be run directly from the car to the truck, which then conveys them to the charging frame-work, (shown in Figs. III and IV,) while a similar truck substitutes charged batteries for those that have been removed.

The frame-work for supporting the batteries while being charged consists of a series of uprights G, which may be strong wooden beams, to which are bolted the rails g. Uprights G are placed at such distance from each other that the rails of each tier (of which there are a number, as shown in Fig. III) coincide with those of the car and truck.

In Fig. IV is shown an elevator, of which K represents the movable platform, and k the posts or uprights, the platform being close to the frame-work for supporting the batteries. By hoisting means of any suitable kind platform K can be raised until the rails on truck E coincide with that tier of rails g upon which it is desired to place the batteries.

The charging-circuits will be readily understood by reference to Fig. III. The main line 1 from the charging-dynamo L is divided into a number of branches 2 3 4 5, one of which runs to each tier of rails. Two rollers of each battery-vessel are connected with the inclosed elements, so as to serve as terminals, and adjacent rails g, on opposite sides of beams G, are electrically connected. Consequently the placing of the batteries upon their supporting-rails automatically connects them in circuit with the dynamo L. So, also, when the batteries are placed in car A, they become at once connected in circuit with the motor which they are to drive.

It is obvious that in carrying out my invention I am not limited to details of construction, which in many cases might be varied or modified according to convenience, and, further, that parts of the system may be used separately without departing from the spirit of the invention,

Having now described my said invention, what I claim is—

1. A car or other vehicle having compartments all open at the side for the admission of batteries and transverse rails near the top of each compartment, in combination with a series of battery-vessels having rollers adapted to run on said rails, substantially as described.

2. The combination, with secondary batteries having rollers for suspending the same, of U-shaped castings constituting supporting-rails, each casting forming two rails, substantially as described.

3. A charging system for electric railways employing secondary batteries, in which the batteries are supported by grooved rollers running on rails transverse to the vehicle, said system comprising a transfer-truck having transverse rails corresponding in position and number to those on the vehicles, and a supporting frame-work having similar rails and adapted to receive the batteries from said truck and support them while being charged, substantially as described.

4. In a charging system for secondary batteries, the combination, with a transfer-truck having rails for supporting a series of batteries, of a frame-work having corresponding rails arranged in tiers one above the other and an elevator for raising said truck to the level of any of said tiers, substantially as described.

5. The combination, with a series of secondary batteries provided with rollers, two of which, on opposite sides of the vessel, are connected with the battery elements to act as terminals, of a series of supporting-rails for said rollers, the rails at the extreme ends being connected with the terminal wires of a circuit, and the adjacent intermediate rails being electrically connected, so that the said circuit is completed when the batteries are put in place upon their respective rails, substantially as described.

6. In a charging system for secondary batteries, a frame-work adapted to receive said batteries for charging, said frame-work comprising uprights and two or more series of supporting-rails arranged in tiers one above the other, in combination with a transfer-truck having rails corresponding with those on the frame-work, substantially as described.

7. The frame-work for holding secondary batteries while being charged, said frame-work being provided with several series of rails arranged in horizontal tiers, in combination with a charging-dynamo, a main circuit, parallel branch circuits leading therefrom to the end rails of each horizontal tier, respectively, the intermediate adjacent rails being electrically connected, and a series of battery-vessels provided with rollers for running on said rails, said rollers constituting the terminals of the batteries, substantially as described.

In testimony whereof I have signed this specification in the presence of two subscribing witnesses.

ANDREW L. RIKER.

Witnesses:
PHILIP MAURO,
CHARLES J. HEDRICK.